(No Model.)
L. KRUB.
WEEDER.
No. 598,251. Patented Feb. 1, 1898.
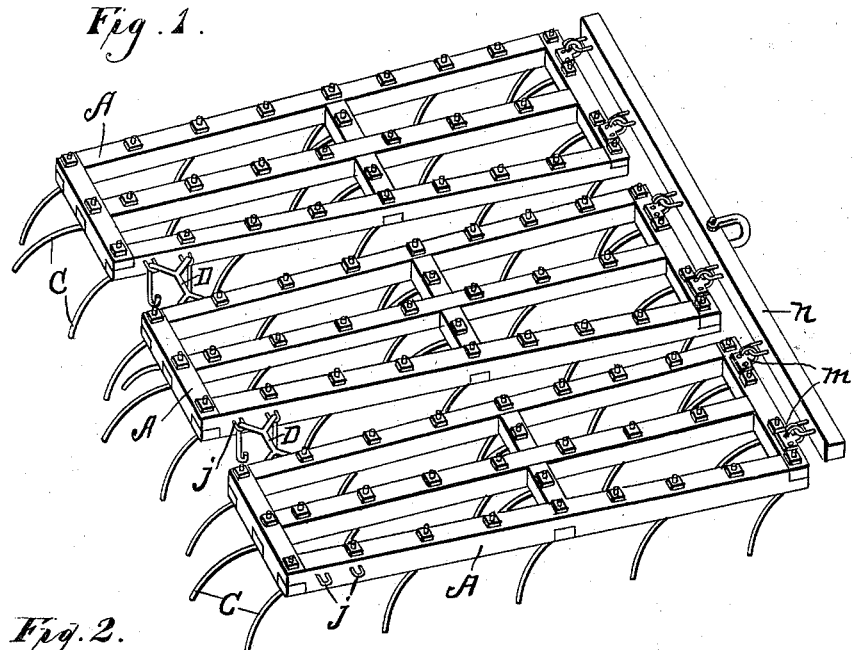
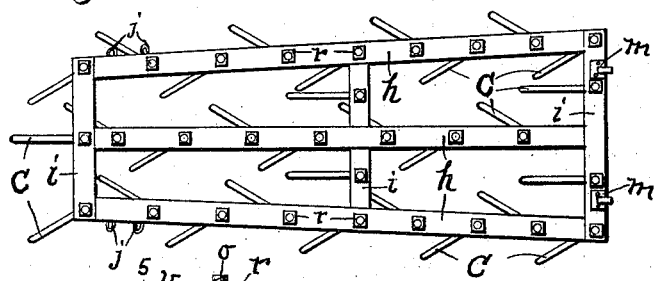
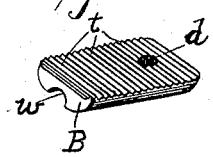
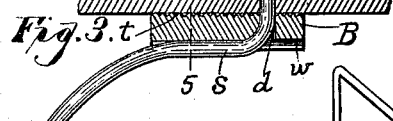
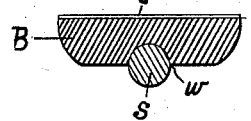
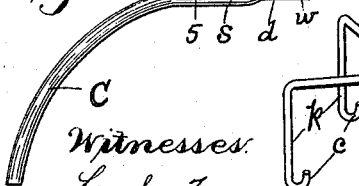

United States Patent Office.

LOUIS KRUB, OF ST. ANSGAR, IOWA.

WEEDER.

SPECIFICATION forming part of Letters Patent No. 598,251, dated February 1, 1898.

Application filed April 23, 1897. Serial No. 633,487. (No model.)

*To all whom it may concern:*

Be it known that I, LOUIS KRUB, a citizen of the United States, residing at St. Ansgar, in the county of Mitchell and State of Iowa, have invented certain new and useful Improvements in Weeders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to weeders of the class composed of a series of sections and provided with teeth which are adapted to be drawn upon the surface of the ground for the purpose of destroying the weeds that spring up in newly-planted ground and at the same time slightly cultivating and breaking the surface.

The objects of my invention are, first, to provide a weeder of that class that will be cheap of construction; second, that will be light and effective; third, that is so constructed that it can be made wider or narrower when so desired by removing part of or adding to the sections composing the complete weeder; fourth, to provide an implement of that class that will destroy small surface plants or weeds without injury to grain or vegetables that are planted at some depth below the surface, and, fifth, to provide an improved means for securing the teeth in the desired position.

The invention consists in the construction and combination of parts shown in the accompanying drawings and described in the following specification.

In the drawings, Figure 1 is a perspective view. Fig. 2 is a top plan view of one of the sections. Fig. 3 is a sectional view through a portion of one of the pieces composing the sections, showing the manner of attaching the teeth. Fig. 4 is a perspective view of one of the plates which secure the teeth. Fig. 5 is a sectional view of the tooth and plate, taken on the line 5 5 of Fig. 3; and Fig. 6 is a perspective view of the coupling whereby the sections are secured together at the rear ends.

The sections A are each formed by three long pieces $h$, secured together by the short cross-pieces $i$, the short and long pieces being preferably mortised that they may fit together neatly and at the same time strengthen the frame. The pieces $h$ and $i$ are provided with openings $v$ at suitable intervals, through which the threaded upper ends $o$ of the teeth C extend. The sections A gradually narrow from the front to the rear until the rear ends are substantially one-third narrower than the front ends. Staples $j$ are driven into the side pieces $h$ on each side of the sections near the rear end for the purpose of receiving the diverging hooks $k$ of the coupling D, whereby the sections A are held together. The coupling D, being of one piece of rigid material of a length sufficient to fill the space between the rear ends of two sections when in position, serves to prevent the rear ends from coming together or becoming separated on account of the inequalities of the ground, as might be the case were no coupling used. The hooks $k$ are of considerable length and thereby permit of the ordinary movement up or down of each section independent of the other, and are provided with the curved ends $c$, which prevent their disengagement with the staples $j$. The front cross-piece of each section is provided with two hook-plates $m$, whereby the sections are attached to the draft-bar $n$. The teeth C have the threaded upper ends $o$ bent up at right angles from the straight portions $s$, which enter the bolt-openings $v$ in the pieces $h$ and $i$, and the plates B, having the grooves $w$, are placed upon the threaded ends $o$, with the straight portions $s$ of the teeth C within the grooves $w$, and pass through the openings $d$ of the plates B, and the threaded ends $o$ of said teeth are drawn up by means of nuts $r$, which prevent the teeth from turning or twisting. The plates B are also provided upon their upper face with corrugations $t$ as a further means of preventing the plates from twisting when placed in the desired position. When the nuts $r$ are drawn up tight, the straight portions $s$ of the teeth lie in the grooves $w$ and the corrugations $t$ will press into the wood, of which the pieces $h$ and $i$ are formed and effectually prevent their slipping or turning. By this means the teeth may be set to cover the entire surface or to travel in rows or otherwise, as may be desired, and are secure against turning when so placed.

The couplings D may be used as handholds to raise the rear ends of the sections to clear the teeth of trash and the ends $c$ catch on the staples $j$ and prevent their disengagement. Immediately back of the straight portions $s$ the teeth C begin to curve downwardly and are curved throughout therefrom to the lower ends. The teeth are preferably about fifteen inches in length and are formed from spring-steel, preferably about five-sixteenths of an inch in thickness.

It is not the purpose of my invention to accomplish the work of a heavy harrow or cultivator, but to provide a light implement that can be used to destroy young surface-weeds in newly-planted fields without injury to the crops planted therein at some depth, which could not be accomplished with a heavy or cumbersome implement. It is also useful to drag in grass-seed, and on account of its lightness a large number of sections could be coupled together for such a purpose, thus enabling the operator to cover the ground rapidly.

Having described my invention, what I claim, and desire to secure by Letters Patent of the United States, is—

1. In a sectional weeder of the class described, comprising a series of sections A, each section gradually narrowing from the front to the rear and having the rear ends suitably spaced by means of loosely-secured couplings D, the combination of the tooth C curved at its lower end and having the straight portion $s$, and the upturned threaded end $o$, with the plate B having the groove $w$ to receive the straight portion $s$, and the openings $d$ to receive the ends $o$ of said teeth, and having in its upper face the corrugations $t$, substantially as set forth.

2. In a weeder of the class described, the combination with the frame thereof having openings $v$, of the tooth-securing plate B, having the corrugations $t$ upon its upper face to engage said frame, the opening $d$ and the groove $w$; and the tooth C curved at its lower end and having the straight portion $s$ adapted to lie within the groove $w$ and the threaded end $o$ adapted to pass through the opening $d$ of said plate B, and the opening $v$ in the frame, said plate and tooth secured upon said frame by means of a nut $r$, all as shown and described.

In testimony whereof I affix my signature in presence of two witnesses.

LOUIS KRUB.

Witnesses:
   R. C. LUBIENS,
   J. F. KOCH.